US005781341A

United States Patent [19]
Lee

[11] Patent Number: 5,781,341
[45] Date of Patent: Jul. 14, 1998

[54] MOTORIZED TUNABLE FILTER AND MOTORIZED VARIABLE ATTENUATOR

[75] Inventor: Ho-Shang Lee, El Sobrante, Calif.

[73] Assignee: Dicon Fiberoptics, Inc., Berkeley, Calif.

[21] Appl. No.: 590,840

[22] Filed: Jan. 24, 1996

Related U.S. Application Data

[60] Provisional application No. 60/000,629 Jun. 30, 1995.

[51] Int. Cl.$^6$ .............................. G02B 27/00; G02B 6/00
[52] U.S. Cl. ..................... 359/578; 359/813; 359/900; 385/140
[58] Field of Search ........................ 359/566, 570, 359/578, 579, 615, 233, 234, 236, 641, 811, 813, 822, 896, 210, 900; 385/140, 134, 25, 27; 356/332, 352, 416, 305, 310, 331, 73.1; 250/227.18

[56] References Cited

U.S. PATENT DOCUMENTS

| | | | |
|---|---|---|---|
| 3,563,654 | 2/1971 | Vermande | 356/305 |
| 3,588,245 | 6/1971 | Herriott et al. | 359/578 |
| 3,740,144 | 6/1973 | Walker | 359/578 |
| 4,095,897 | 6/1978 | Tsunazawa et al. | 356/332 |
| 4,315,691 | 2/1982 | Perkins et al. | 356/331 |
| 4,519,671 | 5/1985 | Curtis et al. | 385/140 |
| 4,645,294 | 2/1987 | Oguey et al. | 385/140 |
| 4,770,478 | 9/1988 | Cross et al. | 359/590 |
| 4,813,756 | 3/1989 | Frenkel et al. | 385/73 |
| 4,878,730 | 11/1989 | Wall | 385/140 |
| 5,212,745 | 5/1993 | Miller | 385/25 |
| 5,287,214 | 2/1994 | Robertson et al. | 359/260 |
| 5,491,582 | 2/1996 | Fujita | 359/234 |

FOREIGN PATENT DOCUMENTS

| | | | |
|---|---|---|---|
| 0 089 758 | 9/1983 | European Pat. Off. | 385/140 |
| 0 068 400A1 | 8/1994 | European Pat. Off. | 359/234 |
| 56-085704 | 7/1981 | Japan | 385/140 |
| 62-270901 | 11/1987 | Japan | 385/140 |
| A 64-55514 | 3/1989 | Japan | 385/140 |
| 3-197845 | 8/1991 | Japan | 359/578 |

OTHER PUBLICATIONS

IBM Technical Disclosure Bulletin, vol. 19, No. 6, E.S. Mathisen, "Discrete Interferenc Filter Monochromator", Nov. 1976.

Y. Suemura, et al. "A Newly Developed Wavelength Tunable Filter For Wavelength Selective Optical Communications System", Inst. Elec. Data Comm. Eng. of Japan, Autumn 1993 Conf., Paper No. B–904.

"Fiber Optic Networks," Paul E. Green, Jr., Prentice–Hall, Englewood Cliffs, New Jersey, Chapter 4, 1993.

"Stable Ultra–Narrow Bandpass Filters," Mike Scobey and Paul Stupik, SPIE's International Symposium, 1994, San Diego, California.

*Primary Examiner*—Paul M. Dzierzynski
*Assistant Examiner*—John Juba, Jr.
*Attorney, Agent, or Firm*—Majestic, Parsons, Siebert & Hsue

[57] ABSTRACT

A tunable filter includes a filter whose characteristic wavelength band changes with the angle of incidence of the incoming light beam with respect to its normal direction, a motor for rotating the filter in order to change the angle of incidence, and a controller controlling the motor to rotate the filter by an amount so that the filter has a desired characteristic wavelength band. A variable attenuator for adjusting insertion loss between an input light beam and an output light beam includes a pair of input and output collimators, a cam connected to at least one of the two collimators, and a motor for rotating the cam for displacing one collimator relative to the other in order to adjust the insertion loss between the input and output light beams.

16 Claims, 3 Drawing Sheets

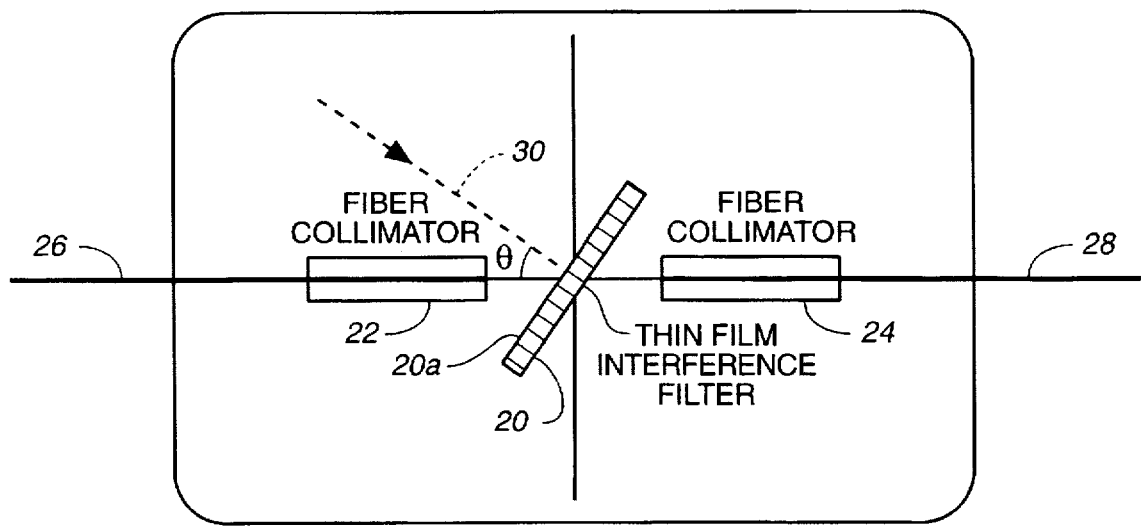
FIG._1
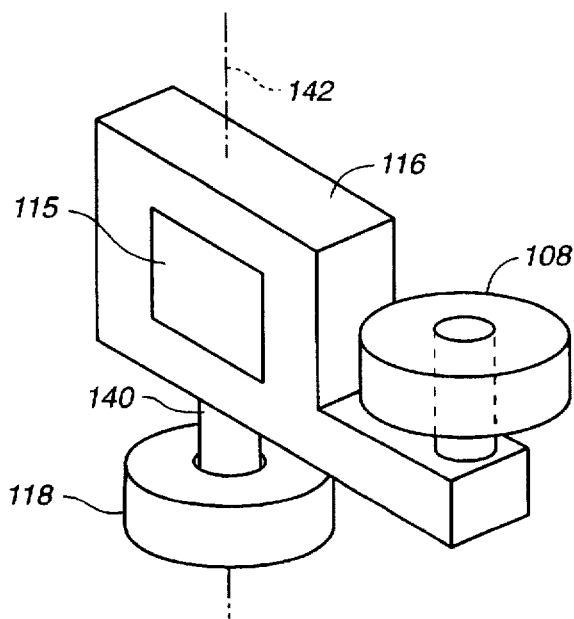
FIG._3

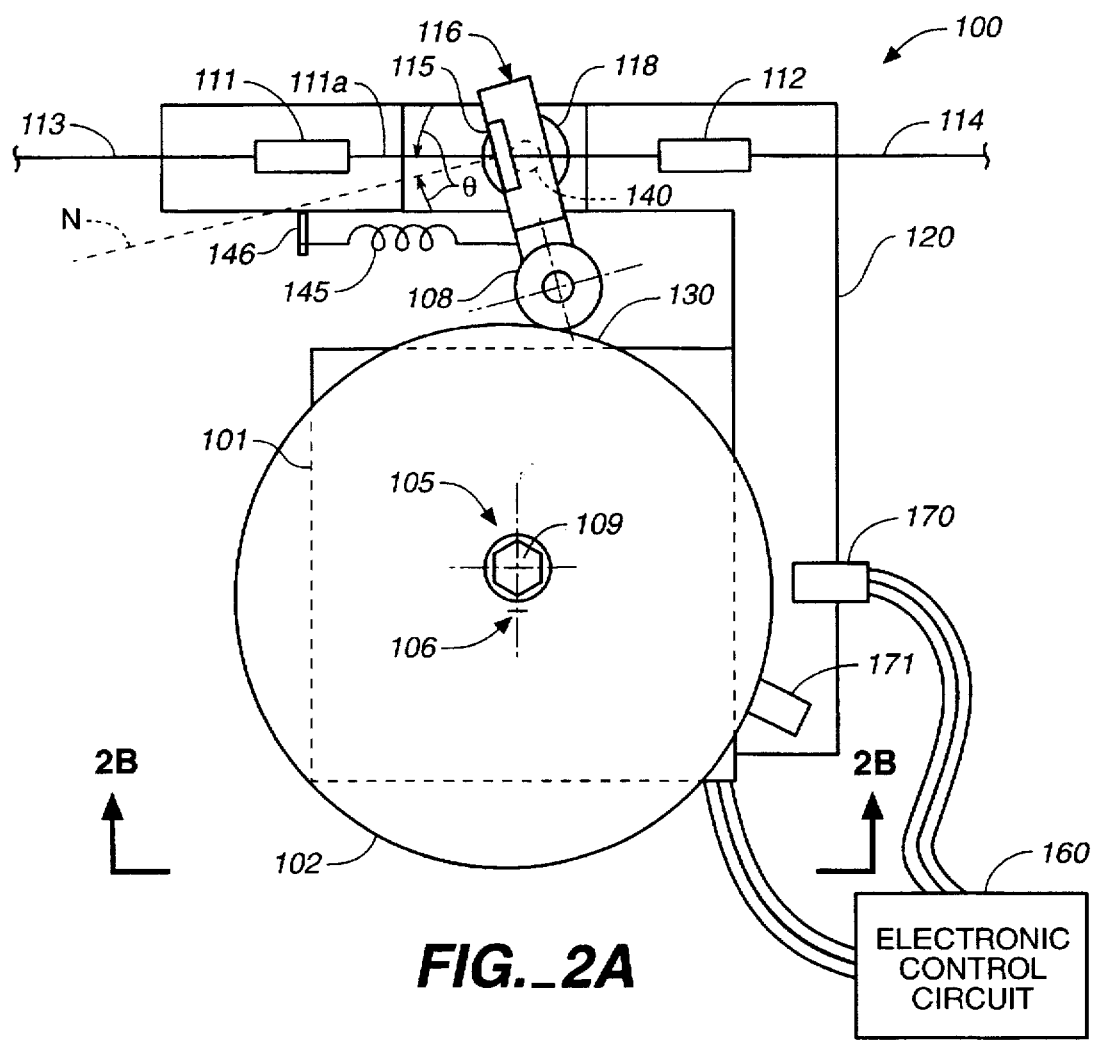
*FIG._2A*
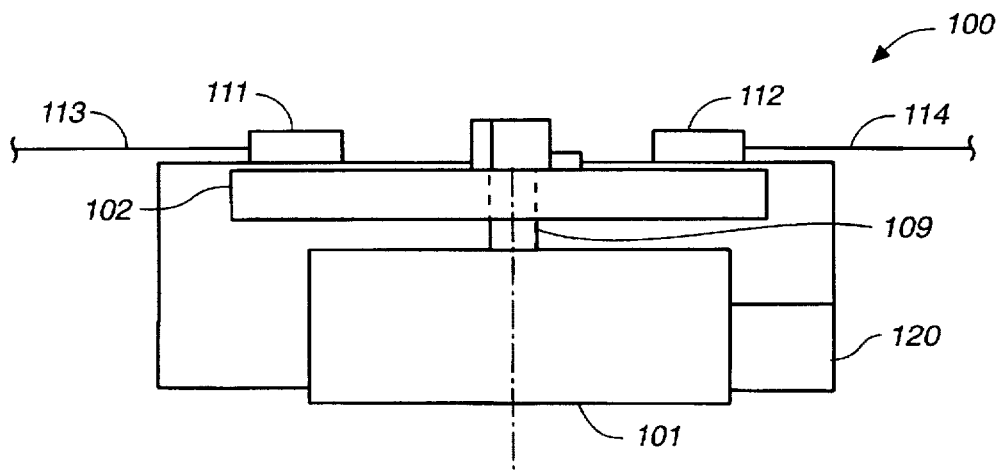
*FIG._2B*

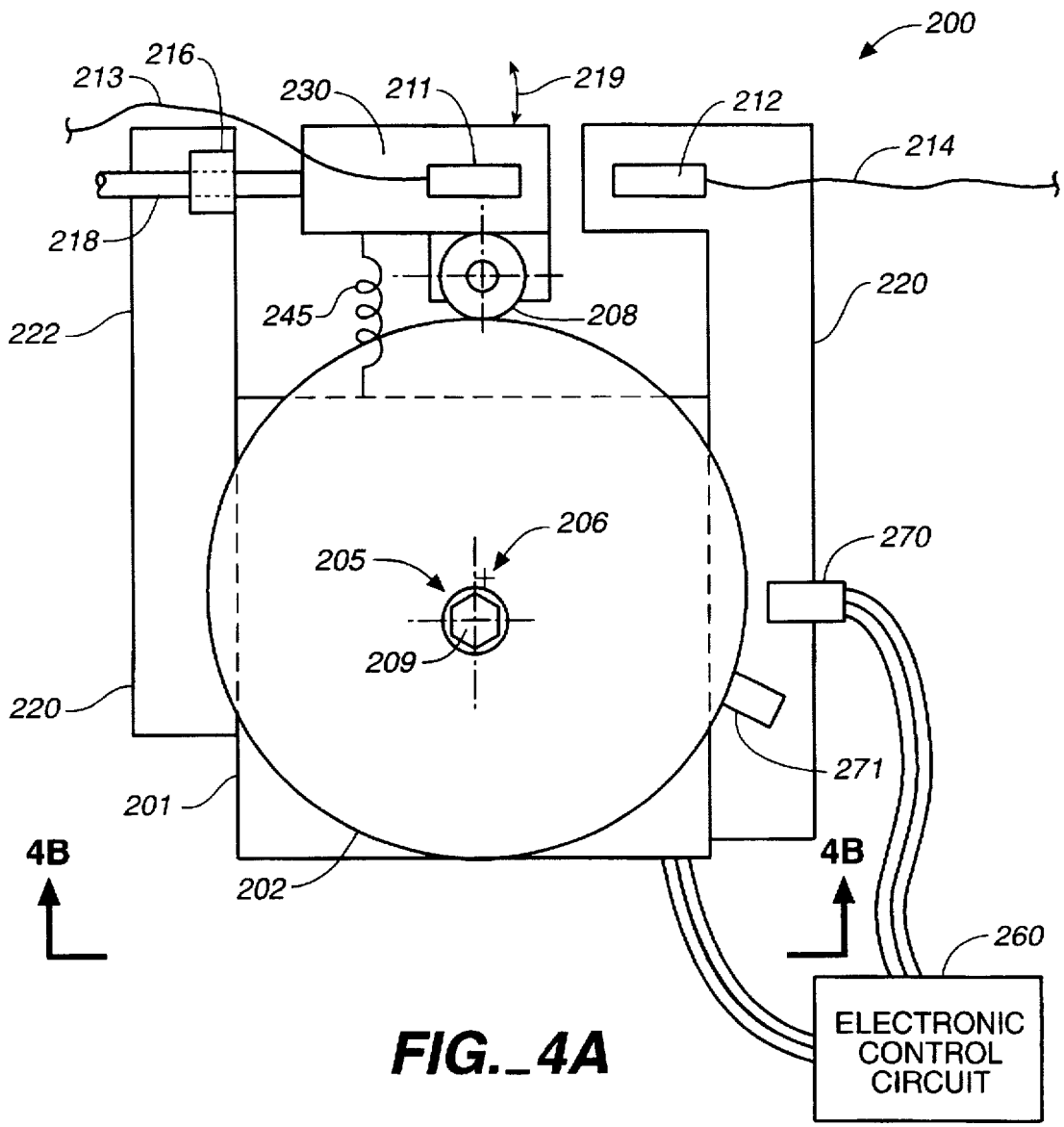
*FIG._4A*
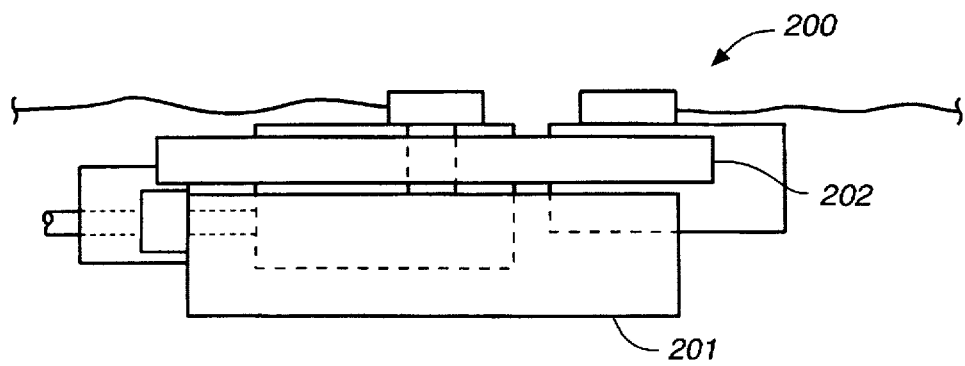
*FIG._4B*

MOTORIZED TUNABLE FILTER AND MOTORIZED VARIABLE ATTENUATOR

CROSS-RELATED REFERENCE

This application is a continuation-in-part of copending provisional application entitled "VARIABLE ATTENUATOR FOR FIBEROPTIC INSTRUMENTS," Ser. No. 60/000,629, filed Jun. 30, 1995.

BACKGROUND OF THE INVENTION

This invention relates to a motorized tunable filtering system and a motorized variable attenuation system.

In recent years, optical fiber technology for telecommunication has progressed rapidly. While the theoretical transmission capacity of the single-mode optical fiber has been recognized in the industry as extremely high from the day such fiber was introduced, much of the capacity has not been utilized. For the increasing demand for bandwidth, such as in the transmission of video images and graphics, much attention has been directed lately toward the maximal utilization of the bandwidth of the single-mode fiber. The common schemes for increasing bandwidth utilization include time division multiplexing or wavelength division multiplexing (WDM).

In a WDM system, multiple signal sources emitting at different wavelengths are coupled into the same single-mode fiber by means of a multiplexer. After the signals of different wavelengths are transmitted through the fiber to a desired destination, the multiple wavelength signals carried by the respective multiple wavelengths must then be separated by means of a demultiplexer into separate optical channels, each wavelength being carried by a different channel to a detector. A tunable filter may be used to select any specific wavelength out of the multiple wavelengths that are carried by the single-mode fiber.

Conventional tunable filters employing Fabry-Perot interference, Mach-Zehnder interference, acoustic tuning and thin film interference filter. U.S. Pat. No. 5,212,745 discloses a tunable filter design constructed with Fabry-Perot etalon. This type of tunable filter can have very narrow bandwidth, but is very sensitive to temperature change. Other tuning methods such as some of those mentioned above are disclosed in Chapter 4 of "Fiber Optic Networks," by Paul E. Green, Jr., Prentice-Hall, Englewood Cliffs, N.J., 1993.

None of the above-described tunable filters is entirely satisfactory. It is therefore desirable to provide an improved motorized tunable filter system with improved characteristics.

In optical communication, a number of input optical fiber channels may be aligned with a corresponding number of output optical fiber channels so that each input optical fiber channel and the output optical fiber channel it is aligned to form an input/output optical fiber pair. In such event, it may be desirable to adjust the insertion loss for some or all of the input/output optical fiber pairs until each pair has the desired insertion loss. For example, it may be desirable for the insertion loss to be adjusted for the fibers pairs until all the pairs have the same insertion loss. In such cases, it is desirable to provide a motorized variable attenuation system for adjusting the insertion loss between any pair of input/output pairs of optical fibers.

SUMMARY OF THE INVENTION

One aspect of the invention is directed towards a tunable filtering device for filtering an incident light beam, comprising a filter that passes only light in the incident light beam within a predetermined characteristic wavelength band, wherein said characteristic wavelength band is a function of angle of incidence of the beam with respect to the normal direction of the filter. The device further comprises a motor for rotating the filter in order to alter the angle of incidence of the beam with respect to the normal direction of the filter, and a controller controlling the motor to rotate the filter by an amount so that the filter has a desired characteristic wavelength band.

Another aspect of the invention is directed towards a method for filtering an incident light beam, comprising the steps of providing a filter that passes only light in the incident light beam within a predetermined characteristic wavelength band, wherein said characteristic wavelength band is a function of angle of incidence of the beam with respect to the normal direction of the filter; and rotating a cam connected to the filter in order to rotate the filter, thereby altering the angle of incidence of the beam with respect to the normal direction of the filter so that the filter has a desired characteristic wavelength band.

Another apsect of the invention is directed towards a variable attenuator for adjusting insertion loss between an input light beam and an output light beam, comprising an input collimator for collimating the input light beam; an output collimator for collimating the output light beam; a cam connected to at least one of the two collimators; and a motor for rotating the cam for displacing said at least one collimator relative to the other in order to adjust insertion loss between the input and output light beams.

Yet another aspect of the invention is directed towards a method for adjusting insertion loss between an input light beam and an output light beam, comprising the steps of aligning an input collimator carrying an input light beam and an output collimator carrying an output light beam; and rotating a cam connected to the at least one of the two collimators in order to displacie said at least one collimator relative to the other in order to adjust insertion loss between the input and output light beams.

BRIEF DESCRIPTION OF THE DRAWINGS

FIG. 1 is a schematic view of a thin film interference filter which passes only within the predetermined characteristic wavelength band, where such band is a function of angle of incidence of the light with respect to the normal direction of the filter.

FIG. 2A is a side view of a motorized tunable filtering device to illustrate the preferred embodiment of one aspect of the invention.

FIG. 2B is a bottom view of the device of FIG. 2A from direction of arrow 2B in FIG. 2A except for the electronic components of the device.

FIG. 3 is a perspective view of a portion of the device of FIG. 2A.

FIG. 4A is a side view of a motorized variable attenuator for adjusting the insertion loss between an input optical fiber and an output optical fiber.

FIG. 4B is a bottom view of the attenuator of FIG. 4A from the direction of the arrow 4B in FIG. 4A except for the electronic components of the attenuator.

DETAILED DESCRIPTION OF THE PREFERRED EMBODIMENT

FIG. 1 is a schematic view of a filter having a characteristic property that the filter passes incident light of wavelengths within a characteristic wavelength band and reflect incident light of wavelengths outside the band. In the preferred embodiment, the filter may be a thin film interference filter. As shown in FIG. 1, filter 20 is placed between two fiber collimators 22, 24. Collimator 22 collimates an incoming beam carried by optical fiber 26 and collimator 24 collimates the light that has passed through filter 20 to output optical fiber 28. Filter 20 has a flat surface 20a so that a normal direction of incidence (or simply a normal direction) 30 may be defined for filter 20, where direction 30 is normal to surface 20a and pointing in the direction towards the filter.

As is known to those skilled in the art, many filters have the characteristic that their characteristic wavelength band varies with the angle of incidence of the incident light to the normal incidence direction of the filter. An interference type filter has such characteristic. For a detailed description of the characteristics of such interference filters, please see "Stable Ultra-Narrow Bandpass Filters," by Mike Scobey and Paul Stupik, presented at SPIE's International Symposium, Jul. 1994, San Diego, Calif. Such property is illustrated in FIG. 1. Thus, if $\lambda_0$ is the center wavelength of light that is passed by filter 20 at zero angle of incidence (that is, when light is directed to the filter along direction 30), then the center frequency $\lambda_\theta$ of the characteristic wavelength band of incident light at angle of incidence θ is given by the following equation:

$$\lambda_\theta = \lambda_0 (1 - a \sin^2\theta)^{1/2}$$

where a is the coefficient related to the effective refractive index of thin films in the thin film interference filter 20. A typical value of a is 0.35.

This invention is based on the observation that a motorized tunable filter can be achieved by rotating the filter by means of a motor mechanism in order to change the characteristic wavelength band of the filter 20.

In the current commercially available filter, the tunable incidence angle of the filter such as 20 can go up to 20° without significantly altering the fundamental properties of the filter, such as bandwidth, insertion loss as well as polarization dependent loss. The center wavelength shift associated with 20° is about 32 nanometers at the 1550 nanometer operating wavelength window, which is applicable for the wavelength selection in the WDM system.

As shown in FIGS. 2A, 2B, the motorized tunable filter 100 comprises a stepping motor 101 which rotates a cam 102 having a geometric center 106. A through hole 105 displaced from the geometric center 106 is created through cam 102 and an axle 109 is inserted into the through hole. Cam 102 has surface 130 in contact with a bearing 108. The thin film filter element 115 is mounted onto a filter holder 116; bearing 108 is mounted onto filter holder 116 in a manner shown in FIG. 3. Thus when motor 101 rotates cam 102 about axle 109, since the axle 109 is off the geometrical center of the cam, such rotation of cam 102 will either push up bearing 108 or allow it to be lowered due to the action of the cam. Thus cam 102 may comprise a cylinder so that surface 130 is cylindrical. Filter holder 116 is supported by bearing 118 through a shaft 140 as shown in FIGS. 2A and 3. The bearing 118 is embedded in the housing frame 120 as shown in FIG. 2A. Thus as cam 102 is rotated by the motor 101, surface 130 in contact with bearing 108 would cause the bearing to be raised or lowered, thereby rotating filter holder 116 about shaft 140. This then causes the filter element 115 to also rotate about shaft 140.

The filter element 115 is placed between an input collimator 111 carrying an input light beam from input optical fiber 113 and output collimator 112 carries the output light beam to an output optical fiber 114. The input direction 111a of the input light beam in input collimator 111 bears an angle θ to the normal direction N of filter element 115. Therefore, as the cam 102 is rotated so as to rotate filter element 115 about shaft 140, such rotation causes angle θ to be altered. The dimensions of cam 102, the location of through hole 105 and axle 109 and the distance between the cam and shaft 140 and other distances can all be chosen so that the angle θ can be adjusted in the range of values up to 25°. The desired angles of rotation of the filter element can be chosen by means of circuit 160 used to control the microstepping of motor 101. The microstepping of the stepper motor 101 can be used to finely tune the incident angle so that 0.01 nanometer tuning resolution is easily obtainable by the microstepping scheme. Thus depending on the dimensions of the various components such as the cam 102, bearing 108, filter holder 116, and their relative positions, device 100 may be calibrated by means of the electronic control circuit 160 for controlling the microstepping. Cam 102 is rotated by means of stepping motor 101 until the desired characteristic wavelength band of filter element 115 is obtained.

Motor 101 is attached to and supported by frame 120. To ensure that the bearing 108 is always in contact with the cam surface 130, a spring 145 is attached to filter holder 116 on one side and a pin 146 attached to frame 120.

An optical proximity switch 170 is employed to provide a parking function for the tunable filter. As the shutter 171 moves into the proximity switch 170 to close the switch, motor rotation of stepper motor 101 will be stopped automatically with the assistance of the electronic control circuit 160.

FIG. 4A is a side view of a variable attenuator to illustrate the preferred embodiment of another aspect of the invention. FIG. 4B is a bottom view of the attenuator of FIG. 4A from the direction of the arrow 4B in FIG. 4A except for the electronic components of the attenuator. As shown in FIGS. 2A, 4A, attenuator 200 bears some structural resemblance to the tunable filter 100 of FIG. 2A.

Thus, as shown in FIGS. 4A, 4B stepper motor 201 rotates cam 202 through an axle 209 inserted in a through hole 205 away from the geometric center 206 of the cam. The surface of the cam is in contact with bearing 208 mounted onto a rotary piece 230, thereby causing the rotary piece to move up and down along arrows 219. A first collimator 211 carrying an input light beam from input optical fiber 213 is attached to the rotary piece 230. Therefore, rotation of the cam by stepper motor 201 will cause collimator 211 to also move along arrows 219. The coupling lens means 212 is attached to housing frame 220. Output collimator 212 collects the light from collimator 211 and transmits the collected light to output optical fiber 214. The above-described motion of collimator 211 along arrows 219 will cause the insertion loss between collimators 211, 212 to change. In a manner similar to device 100, device 200 may be calibrated by means of electronic control circuit 260. Circuit 260 can be used to program the stepping motor 201 to finely tune the insertion loss.

Rotary piece 230 is mounted onto housing frame 220 by means of a shaft 218 which passes through a bearing 216 embedded in the housing frame 220. Shaft 218 is permitted to rotate about bearing 216 to rotate, thereby permitting the rotary piece 230 to move along arrows 219. In the preferred embodiment, the displacement along arrows 219 is in the range of 0.4 millimeters, although larger ranges of up to 0.6 millimeters may be useful in some applications. Again a spring 245 connecting the rotary piece 230 to the outside frame of stepping motor 201 ensures that bearing 208 is always in contact with the surface of cam 202. A proximity switch 270 and shutter 271 perform the same function as proximity switch 170 and shutter 171 in FIG. 2A.

Thus to adjust the insertion loss between the input and output light beams, the two collimators 211 and 212 are first aligned. Then cam 202 is rotated by means of stepping motor 201 until the desired insertion loss is obtained.

The preferred embodiments described above of the tunable filter 100 and the variable attenuator 200 are particularly advantageous since their overall thickness can be made to be quite small. In the preferred embodiment, for example, the overall thickness of the tunable filter as well as the variable attenuator can be made to be less than about 1 inch or even 0.8 inch.

While a cam rotatably mounted onto an axle that is off its geometric center is used for rotating the filter in the tunable filter to alter the characteristic wavelength band of the filter, it will be understood that other mechanisms for rotating the filter can also be used and is within the scope of the invention.

While in the preferred embodiment, a cam mounted on an axle that is off the center of the cam is used for moving one collimator relative to the other collimator in order to adjust the insertion loss, it will be understood that other mechanisms for accomplishing the same result can be used and is within the scope of the invention. Furthermore, while the cam is shown to contact only one of the two collimators, essentially the same result can be obtained even if the cam contacts both collimators, as long as the rotation of the cam will cause relative motion between the two collimators in order to adjust the insertion loss between the two collimators. Such and other variations are within the scope of the invention.

While the invention has been described above by reference to various embodiments, it will be understood that different changes and modifications may be made without departing from the scope of the invention which is to be limited only by the appended claims.

What is claimed is:

1. A tunable filtering device suitable for use with a wavelength division multiplexed channel, comprising:

an input optical fiber;

means for collimating a light beam from the input optical fiber to provide an incident light beam;

filter means for passing only light in the incident light beam within a predetermined characteristic wavelength band, wherein said characteristic wavelength band is a function of angle of incidence of the beam with respect to a surface normal of the filter means;

a motor for rotating the filter means in order to alter the angle of incidence of the beam with respect to the surface normal of the filter; and a controller controlling the motor to rotate the filter means by an amount so that the filter means has a desired characteristic wavelength band in the wavelength division multiplexed channel.

2. The tunable filtering device of claim 1, further comprising a cam connected to the filter means, said motor rotating the cam in order to rotate the filter means.

3. The tunable filtering device of claim 2, said tunable filtering device having an overall thickness less than about 1 in.

4. The tunable filtering device of claim 2, said filter means rotatably mounted onto an axle, said tunable filtering device further comprising a housing holding the filter and a bearing attached to the housing, said cam being in contact with the bearing to cause rotation of the filter about the axle.

5. The tunable filtering device of claim 4, said tunable filtering device having an overall thickness less than about 1 in.

6. The tunable filtering device of claim 1, said motor being a stepper motor.

7. The tunable filtering device of claim 6, said controller and said motor being such that the center wavelength of the characteristic wavelength band is tunable to a resolution of 0.01 nm.

8. The device of claim 1, further comprising:

an output optical fiber; and lens means for focusing light emerging from the filter means to the output optical fiber.

9. The device of claim 1, said controller controlling the motor to rotate the filter means so that the angle of incidence is adjustable in a range of values up to 25°.

10. A variable attenuator for adjusting insertion loss between an input light beam and an output light beam, comprising:

a first means for collimating the input light beam;

a second means for coupling the output light beam;

a cam connected to at least one of the first and second means; and a motor for rotating the cam for displacing said at least one of the first and second means relative to the other in order to adjust insertion loss between the input and output light beams.

11. The tunable filtering device of claim 10, said variable attenuator having an overall thickness less than about 1 in.

12. The variable attenuator of claim 10, said at least one of the first and second means being rotatable about an axis, said variable attenuator further comprising a bearing connected to the first or second means, said cam being in contact with the bearing to cause rotation of the first or second means about the axis.

13. The variable attenuator of claim 12, said variable attenuator having an overall thickness less than about 1 in.

14. The variable attenuator of claim 10, said motor being a stepper motor.

15. An tunable filtering device for filtering an incident light beam, comprising:

filter means for passing only light in the incident light beam within a predetermined characteristic wavelength band, wherein said characteristic wavelength band is a function of angle of incidence of the beam with respect to a surface normal of the filter means;

a motor for rotating the filter means in order to alter the angle of incidence of the beam with respect to the surface normal of the filter means; and a controller controlling the motor to rotate the filter by an amount so that the filter has a desired characteristic wavelength band and so that the center wavelength of the characteristic wavelength band is tunable to a resolution of 0.01 nm.

16. A method for filtering an incident light beam, comprising the steps of:

providing a filter means for passing only light in the incident light beam within a predetermined characteristic wavelength band, wherein said characteristic wavelength band is a function of angle of incidence of the beam with respect to a surface normal of the filter means; and rotating the filter means to thereby alter the angle of incidence of the beam with respect to a surface normal of the filter means so that the filter means has a desired characteristic wavelength band and so that the center wavelength of the characteristic wavelength band is tunable to a resolution of 0.01 nm, said rotating step including rotating a cam and operating a stepper motor connected to the cam.

* * * * *